US011823249B2

(12) United States Patent
Melcher et al.

(10) Patent No.: US 11,823,249 B2
(45) Date of Patent: Nov. 21, 2023

(54) PROVIDING GESTURE FUNCTIONALITY

(71) Applicant: eBay Inc., San Jose, CA (US)

(72) Inventors: Ryan Melcher, Ben Lomond, CA (US); Dane Howard, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/180,759

(22) Filed: Mar. 8, 2023

(65) Prior Publication Data

US 2023/0222564 A1 Jul. 13, 2023

Related U.S. Application Data

(63) Continuation of application No. 17/672,945, filed on Feb. 16, 2022, now Pat. No. 11,631,121, which is a continuation of application No. 17/006,809, filed on Aug. 29, 2020, now Pat. No. 11,301,920, which is a continuation of application No. 16/165,790, filed on Oct. 19, 2018, now Pat. No. 10,846,781, which is a continuation of application No. 15/214,233, filed on Jul. 19, 2016, now Pat. No. 10,140,647, which is a continuation of application No. 12/559,409, filed on Sep. 14, 2009, now Pat. No. 9,424,578.

(60) Provisional application No. 61/155,097, filed on Feb. 24, 2009.

(51) Int. Cl.
*G06Q 30/00* (2023.01)
*G06Q 30/0601* (2023.01)
*G06F 3/04883* (2022.01)
*G06Q 20/10* (2012.01)
*G06F 3/01* (2006.01)
*G06F 3/04817* (2022.01)

(52) U.S. Cl.
CPC ......... *G06Q 30/0633* (2013.01); *G06F 3/017* (2013.01); *G06F 3/04817* (2013.01); *G06F 3/04883* (2013.01); *G06Q 20/102* (2013.01); *G06Q 30/00* (2013.01); *G06Q 30/0601* (2013.01)

(58) Field of Classification Search
CPC . G06Q 30/0633; G06Q 30/00; G06Q 30/0601
See application file for complete search history.

(56) References Cited

U.S. PATENT DOCUMENTS 7,301,526 B2 11/2007 Marvit et al.
7,685,252 B1 3/2010 Maes et al.
7,705,830 B2 4/2010 Westerman et al.
(Continued)

OTHER PUBLICATIONS

Business Editors/High-Tech Writers. (Jan. 11, 1999). Advanced recognition technologies equips cirque's new cruise cat internet touchpad with ART's handwriting recognition technology for "gesture activation". Business WireRetrieved from http://search.proquest.com/docview/446756160?accountid=14753.*
(Continued)

*Primary Examiner* — Kathleen Palavecino
(74) *Attorney, Agent, or Firm* — FIG. 1 Patents

(57) ABSTRACT

Gesture functionality is provided in a computing environment. In example embodiments, a gesture input is received. A style difference is identified between a known gesture input of a set of known gesture inputs and the received gesture input. The set of known gesture inputs is caused to be modified to include the style difference by updating a database that stores the set of known gesture inputs.

20 Claims, 7 Drawing Sheets

(56) References Cited

U.S. PATENT DOCUMENTS

| | | |
|---|---|---|
| 8,745,541 B2 | 6/2014 | Wilson et al. |
| 9,424,578 B2 | 8/2016 | Melcher et al. |
| 10,140,647 B2 | 11/2018 | Melcher et al. |
| 10,846,781 B2 | 11/2020 | Melcher et al. |
| 11,301,920 B2 | 4/2022 | Melcher et al. |
| 11,631,121 B2 | 4/2023 | Melcher et al. |
| 2003/0110507 A1 | 6/2003 | Dimitrova et al. |
| 2005/0146508 A1 | 7/2005 | Kirkland et al. |
| 2005/0177445 A1 | 8/2005 | Church |
| 2005/0212911 A1 | 9/2005 | Marvit |
| 2005/0261980 A1 | 11/2005 | Hadi |
| 2007/0259717 A1 | 11/2007 | Mattice et al. |
| 2008/0228633 A1 | 9/2008 | Kalt |
| 2008/0281684 A1 | 11/2008 | Stefanik et al. |
| 2008/0288366 A1 | 11/2008 | Schonbucher et al. |
| 2009/0077501 A1 | 3/2009 | Partridge et al. |
| 2009/0143141 A1 | 6/2009 | Wells et al. |
| 2009/0174661 A1 | 7/2009 | Rubinstein et al. |
| 2009/0182622 A1 | 7/2009 | Agarwal et al. |
| 2009/0244309 A1 | 10/2009 | Maison et al. |
| 2009/0286469 A1 | 11/2009 | Jeong et al. |
| 2010/0073284 A1 | 3/2010 | Dods et al. |
| 2010/0083188 A1 | 4/2010 | Pance et al. |
| 2010/0100854 A1 | 4/2010 | Russell et al. |
| 2010/0169842 A1 | 7/2010 | Migos |
| 2010/0182246 A1 | 7/2010 | Petschnigg et al. |
| 2010/0191611 A1 | 7/2010 | Biro |
| 2010/0214231 A1 | 8/2010 | D'Souza et al. |
| 2010/0217685 A1 | 8/2010 | Melcher et al. |
| 2010/0125816 A1 | 10/2010 | Bezos |
| 2011/0041100 A1 | 2/2011 | Boillot |
| 2011/0060754 A1 | 3/2011 | Theimer et al. |
| 2016/0328778 A1 | 11/2016 | Melcher et al. |
| 2019/0057434 A1 | 2/2019 | Melcher et al. |
| 2020/0402140 A1 | 12/2020 | Melcher et al. |
| 2022/0172274 A1 | 6/2022 | Melcher et al. |

OTHER PUBLICATIONS

"Advanced recognition technologies equips cirque's new cruise cat internet touchpad with ART's handwriting recognition technology for "gesture activation"", Business Editors/High-Tech Writers, Business Wire Retrieved at: http://search.proquest.com/docview/446756160?accountid=14753, Jan. 11, 1999, 2 pages.

"Advisory Action", U.S. Appl. No. 12/559,409, dated Jun. 30, 2011, 3 pages.

"Appeal Brief Filed", U.S. Appl. No. 12/559,409, dated Aug. 25, 2011, 24 pages.

"Appeal Decision", U.S. Appl. No. 12/559,409, dated Jan. 16, 2015, 9 pages.

"Examiner's Answer", U.S. Appl. No. 12/559,409, dated Nov. 23, 2011, 15 pages.

"Final Office Action", U.S. Appl. No. 12/559,409, dated Apr. 7, 2011, 15 pages.

"Non-Final Office Action", U.S. Appl. No. 12/559,409, dated Nov. 13, 2015, 16 pages.

"Non-Final Office Action", U.S. Appl. No. 12/559,409, dated Oct. 20, 2010, 18 pages.

"Non-Final Office Action", U.S. Appl. No. 16/165,790, dated Apr. 15, 2020, 7 pages.

"Notice of Allowance", U.S. Appl. No. 15/214,233, dated Jul. 20, 2018, 12 pages.

"Notice of Allowance", U.S. Appl. No. 12/559,409, dated Apr. 19, 2016, 15 pages.

"Notice of Allowance", U.S. Appl. No. 16/165,790, dated Aug. 14, 2020, 8 pages.

"Pre-Appeal Brief Request", U.S. Appl. No. 12/559,409, dated Jul. 6, 2011, 5 pages.

"Preliminary Amendment", U.S. Appl. No. 15/214,233, dated Jul. 22, 2016, 7 pages.

"Response to Final Office Action", U.S. Appl. No. 12/559,409, dated Jun. 6, 2011, 11 pages.

"Response to Non-Final Office Action", U.S. Appl. No. 12/559,409, dated Jan. 20, 2011, 12 pages.

"Response to Non-Final Office Action", U.S. Appl. No. 12/559,409, dated Feb. 12, 2016, 18 pages.

U.S. Appl. No. 12/559,409, , "Response to Decision on Appeal filed on Mar. 16, 2015 for U.S. Appl. No. 12/559,409, dated Jan. 16, 2015", Mar. 16, 2015, 11 pages.

U.S. Appl. No. 16/165,790, , "Corrected Notice Of Allowability received for U.S. Appl. No. 16/165,790, dated Sep. 30, 2020", Sep. 30, 2020, 12 pages.

U.S. Appl. No. 16/165,790, , "Response to Examiner Initiated Interview Summary filed on Sep. 22, 2020 for U.S. Appl. No. 16/165,790, dated Sep. 21, 2020", Sep. 22, 2020, 6 pages.

U.S. Appl. No. 16/165,790, , "Response to Non-Final Office Action filed on Jul. 7, 2020 for U.S. Appl. No. 16/165,790, dated Apr. 15, 2020", Jul. 7, 2020, 7 pages.

U.S. Appl. No. 17/006,809, , "Non-final Office Action received for U.S. Appl. No. 17/006,809, dated Aug. 17, 2021", Aug. 17, 2021, 15 pages.

U.S. Appl. No. 17/006,809, , "Notice Of Allowance received for U.S. Appl. No. 17/006,809, dated Jan. 7, 2022", Jan. 7, 2022, 9 pages.

U.S. Appl. No. 17/672,945, , "Notice of Allowance", U.S. Appl. No. 17/672,945, dated Feb. 1, 2023, 10 pages.

* cited by examiner

PROVIDING GESTURE FUNCTIONALITY

RELATED APPLICATIONS

The present application is a continuation of and claims priority to U.S. patent application Ser. No. 17/672,945, filed Feb. 16, 2022, which is a continuation of and claims priority to U.S. application Ser. No. 17/006,809, filed Aug. 29, 2020, which is now U.S. Pat. No. 11,301,920, issued Mar. 23, 2022, which is a continuation of and claims priority to U.S. application Ser. No. 16/165,790, filed Oct. 19, 2018, which is now U.S. Pat. No. 10,846,781, issued Nov. 4, 2020, which is a continuation of and claims priority to U.S. application Ser. No. 15/214,233, filed Jul. 19, 2016, which now U.S. Pat. No. 10,140,647, issued Nov. 7, 2018, which is a continuation of and claims priority to U.S. application Ser. No. 12/559,409, filed Sep. 14, 2009, which is now U.S. Pat. No. 9,424,578, issued Aug. 3, 2016, which claims the priority benefit of U.S. Provisional Patent Application No. 61/155,097, filed Feb. 24, 2009 and entitled "Systems and Method for Receiving a Gesture Input at a Mobile Device." The content of the aforementioned applications is incorporated in its entirety herein by reference.

BACKGROUND

Computing devices including mobile devices have become increasing popular. These computing devices are capable of executing instructions based on conventional inputs such cursor inputs or keyboard inputs. In some instances, the ability to provide quicker more intuitive inputs may be desired.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based marketplace environment, the embodiments are given merely for clarity in disclosure. Thus, any type of electronic commerce or electronic business system and method, including various system architectures, may employ various embodiments of the gesture input system and method described herein and is considered as being within a scope of example embodiments. Each of a variety of example embodiments is discussed in detail, below.

Example embodiments described herein provide systems and methods for providing gesture functionality at a device. In example embodiments, a gesture input is received. The gesture input represents a commerce-related action, whereby the commerce-related action is to be performed on a networked environment. The gesture input may comprise coordinates associated with the commerce-related action. Furthermore, the gesture input may represent various symbols, such as letters (e.g., B, S, W, P), which represent various commerce-related actions (e.g., a buy commerce-related action, a sell commerce-related action, a watch commerce-related action, or a pay commerce-related action). The gesture input may be received with motion performed relative to a user interface of a device or a motion performed with the device itself, whereby the motion may represent a commerce-related action (e.g., update and refresh commerce-related action).

A determination may be performed to determine that the commerce-related action is executable (e.g., can be performed based on an associated status). The commerce-related action is then performed based on the determination that the commerce-related action is executable. In example embodiments, performing the commerce-related action comprises performing a commerce-related transaction on the networked environment.

Figure 1:
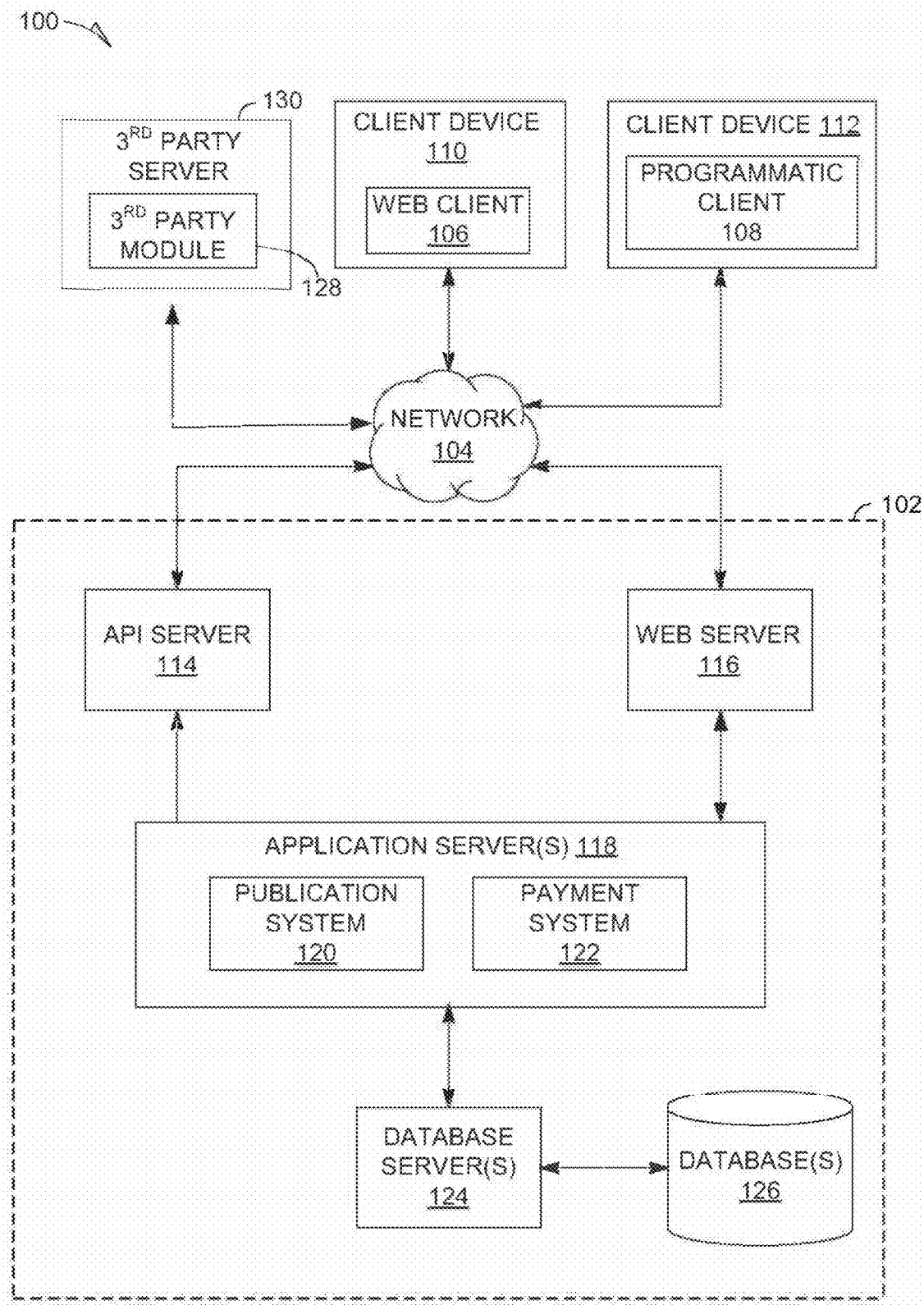
FIG. 1 is a block diagram illustrating an example embodiment of a network architecture of a system used to allow multi-directional visual browsing.

With reference to FIG. 1, an example embodiment of a high-level client-server-based network architecture 100 to provide gesture functions at a device is shown. A networked system 102, in an example form of a network-server-side functionality, is coupled via a network 104 (e.g., the Internet or Wide Area Network (WAN)) to one or more clients. FIG. 1 illustrates, for example, a web client 106 operating via a browser (e.g., such as the INTERNET EXPLORER® browser developed by Microsoft® Corporation of Redmond, Washington State) and a programmatic client 108 executing on, respectively, client devices 110 and 112. The client devices 110 and 112 may include, for example, a mobile phone, a personal digital assistant (PDA), a gaming unit, a portable computing unit, or any other device capable of being communicatively coupled to the network 104.

The network 104 over which the networked system 102 and the client devices 110 and 112 interact may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

An Application Program Interface (API) server 114 and a web server 116 are coupled to, and provide programmatic and web interfaces respectively to, one or more application servers 118. The application servers 118 host a publication system 120 (e.g., a marketplace system or commerce system) and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage databases 126 or repositories.

The databases 126 includes a collection of data comprising item images, transaction data, and item attribute information. The item images may be images used in an item listing to show a picture of the item. The item images may also be used for comparison with the image data received from the client device 110 or 112. The transaction data may include information regarding transactions conducted on the networked system 102. The transactional data may include, by way of example, pricing information for an item during a time period. The item attribute information may include information associated with an item including, for example, an image, title, subtitle, category, sub-category, related item listings, average price, quantities of the item currently available, and any other data that may describe and distinguish the item from other items in the database 126 or other items offered using the networked system 102.

The publication system 120 provides a number of functions and services to users that access the networked system 102. The publication system 120 is discussed in more detail in connection with FIG. 2.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

FIG. 1 also illustrates a third party module 128, executing on a third party server 130, as having programmatic access through the network 104 to the networked system 102 via the programmatic interface provided by the API server 114. For example, the third party module 128 may, utilizing information retrieved from the networked system 102, support one or more features or functions on a website (not shown) hosted by the third party. The third party website may, for example, provide one or more promotional, marketplace, or payment functions that are supported by the relevant applications of the networked system 102.

While the network architecture 100 of FIG. 1 employs a client-server architecture, a skilled artisan will recognize that the present disclosure is not limited to such an architecture. The network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
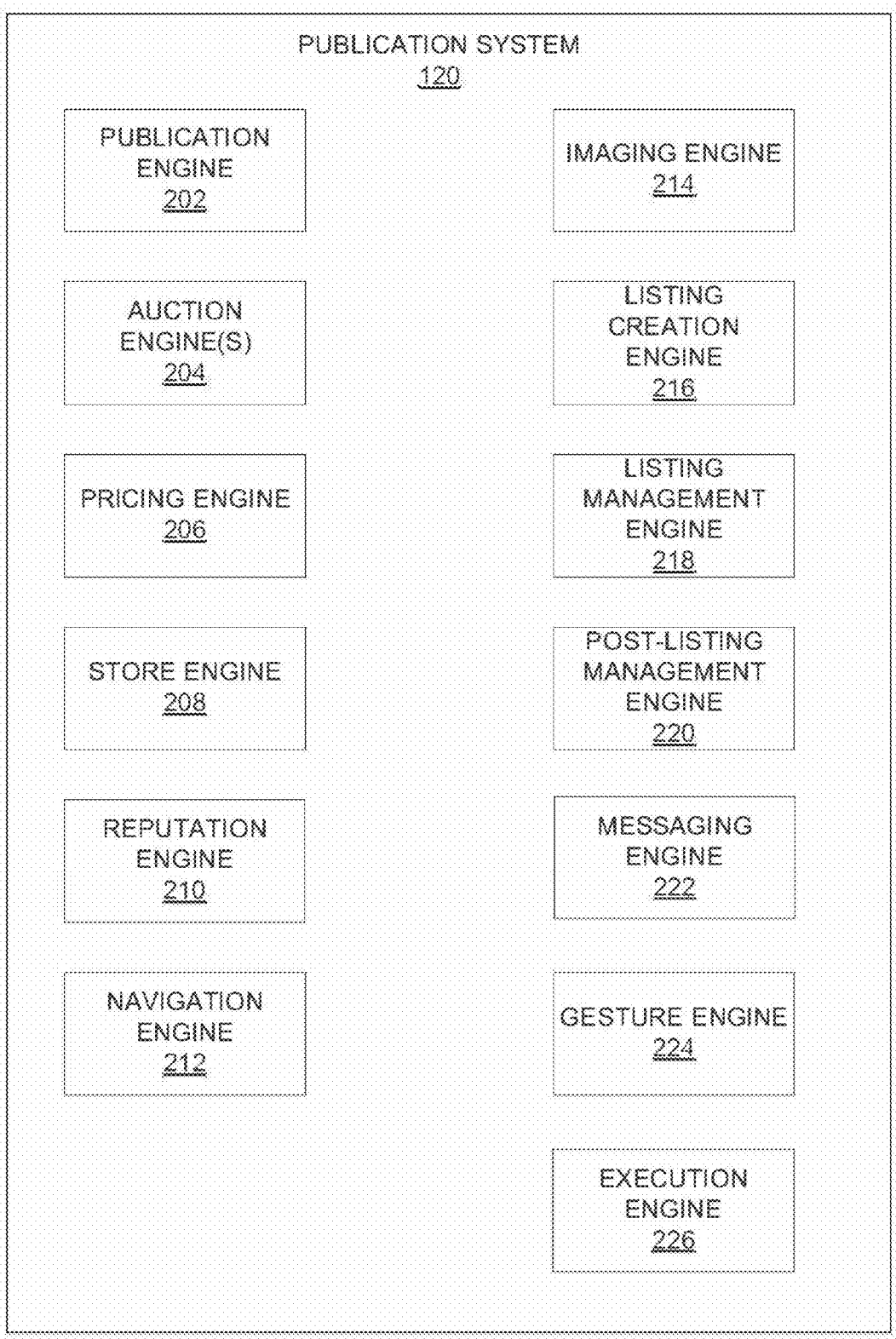
FIG. 2 is a block diagram illustrating an example embodiment of a publication system.

Referring now to FIG. 2, an example block diagram illustrating multiple components that, in one embodiment, are provided within the publication system 120 of the networked system 102 is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

The networked system 102 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.). The various auction engines 204 also provide a number of features in support of these auction-format listings, such as a reserve price feature whereby a seller may specify a reserve price in connection with a listing and a proxy-bidding feature whereby a bidder may invoke automated proxy bidding.

A pricing engine 206 supports various price listing formats. One such format is a fixed-price listing format (e.g., the traditional classified advertisement-type listing or a catalogue listing). Another format comprises a buyout-type listing. Buyout-type listings (e.g., the Buy-It-Now (BIN) technology developed by eBay Inc., of San Jose, California) may be offered in conjunction with auction-format listings and allow a buyer to purchase goods or services, which are also being offered for sale via an auction, for a fixed-price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the networked system 102 supports person-to-person trading between unknown entities, users may otherwise have no history or other reference information whereby the trustworthiness and credibility of potential trading partners may be assessed. The reputation engine 210 allows a user, for example through feedback provided by one or more other transaction partners, to establish a reputation within the networked system 102 over time. Other potential trading partners may then reference the reputation for purposes of assessing credibility and trustworthiness.

Navigation of the network-based marketplace may be facilitated by a navigation engine 212. For example, a search module of the navigation engine 212 enables keyword searches of item listings published via the publication system 120. In a further example, a browser module of the navigation engine 212 allows users to browse various category, catalogue, or inventory data structures according to which listings may be classified within the publication system 120. Various other navigation applications within the navigation engine 212 may be provided to supplement the searching and browsing applications.

In order to make listings available via the networked system 102 as visually informing and attractive as possible, the publication system 120 may include an imaging engine 214 that enables users to upload images for inclusion within publications (e.g., listings) and to incorporate images within viewed listings. The imaging engine 214 also receives image data from a user and utilizes the image data to identify an item depicted or described by the image data. In some embodiments, the imaging engine 214 may receive images representing gesture inputs from the client device.

A listing creation engine 216 allows sellers to conveniently author publications in the example form of listings pertaining to goods or services that sellers wish to transact via the networked system 102, while a listing management engine 218 allows sellers to manage such listings. Specifically, where a particular seller has authored or published a large number of listings, the management of such listings may present a challenge. The listing management engine 218 provides a number of features (e.g., auto-relisting, inventory level monitors, etc.) to assist the seller in managing such listings.

A post-listing management engine 220 also assists sellers with a number of activities that typically occur post-listing. For example, upon completion of an auction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210.

A messaging engine 222 is responsible for the generation and delivery of messages to users of the networked system 102. Such messages include, for example, advising users regarding the status of listings and best offers (e.g., providing an acceptance notice to a buyer who made a best offer to a seller). The messaging engine 222 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

A gesture engine 224 manages receipt and processing of gesture inputs received from a client device (e.g., client device 110). The gesture engine 224 will be discussed in more detail in connection with FIG. 3.

An execution engine 226 manages execution of commands provided via the gesture input. The execution engine 226 will be discussed in more detail in FIG. 4.

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein.

Figure 3:
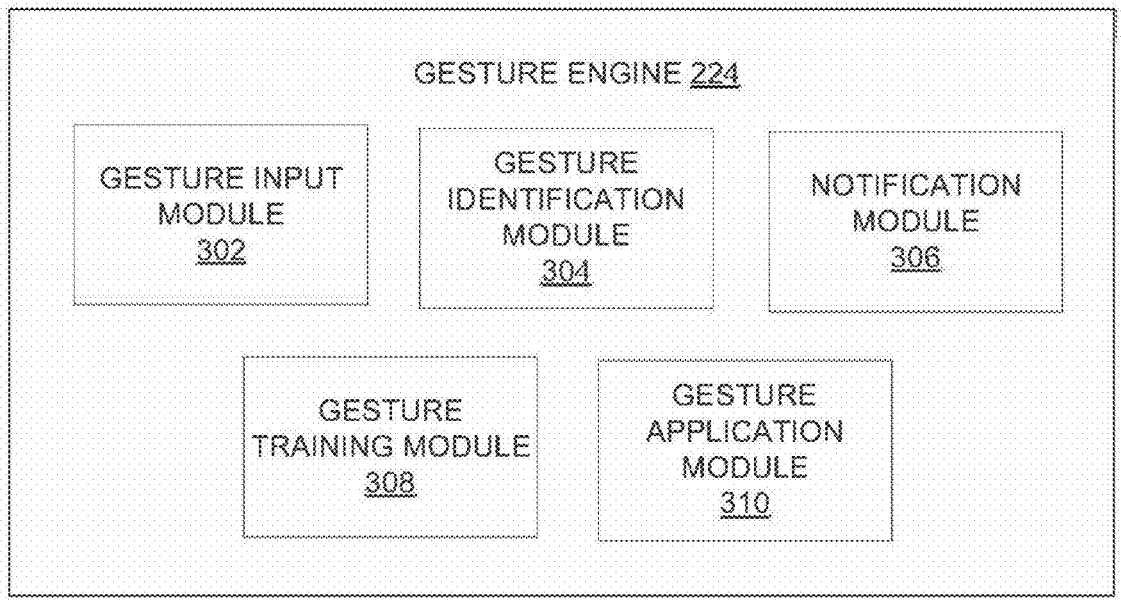
FIG. 3 is a block diagram illustrating an example embodiment of a gesture engine.

Application of Embodiments of the Gesture Function Platform into the Example Network Architecture Referring now to FIG. 3, an example diagram of the gesture engine 224 is shown. The gesture engine 224 receives and processes gesture input received from a client device (e.g., client device 110). In example embodiment, the gesture engine 224 comprises a gesture input module 302, a gesture identification module 304, a notification module 306, a gesture training module 308, and a gesture application module 310. Alternative embodiments may comprise further components or modules. Furthermore, some of the components of the gesture engine 224 may be located elsewhere (e.g., in the execution engine 226 or the messaging engine 222) or be combined into a single module.

In example embodiments, a user at the client device may search for or browse for an item of interest on the network-based marketplace. Based on the search or browse, a listing or other type of publication pertaining to the item of interest is presented to the user on a display of the client device. The user may then indicate a commerce-related action with respect to the item of interest. In some embodiments, the client device may comprise a touch-sensitive display. In these embodiments, the user may indicate the commerce-related action by "writing" an indication or symbol representative of the commerce-related action on the touch-sensitive display as will be discussed further below. Other forms of gestures may also be utilized.

The gesture input module 302 receives a gesture input from the client device that represents a commerce-related action. In example embodiments, the gesture input is received at the client device via the user physically interacting with a user interface presented on the touch-sensitive display or using a mouse to input a gesture via a user interface presented on the client device. In one embodiment, the gesture input is a set of coordinates that represent a gesture. The set of coordinates may represent a letter that symbolizes an action a user at the client device wants to perform. For example, the set of coordinates may represent a "B" for a buy action, "S" for a sell action, "P" for a pay action, or "W" for a watch action. Other letters or symbols (e.g., "S" for a pay action or "+" to add to a shopping cart) may be used to represent other actions that may be used in connection with the network-based marketplace. Alternatively, other letters or symbols may be used to represent actions for other networked environments.

In another embodiment, the gesture input module 302 receives a gesture input that is a motion of a client device. In some embodiments, a motion sensor may be coupled to, or otherwise be embedded within the client device to detect the motion. For example, the gesture input may be a shaking motion (e.g., the client device is shaken). The shaking motion may, in one embodiment, cause a refresh or update action to occur. Any action that may be performed on or to the client device may be used as a gesture input.

The gesture identification module 304 identifies the gesture input received by the gesture input module 302. In some embodiments, a database (e.g., database 126) of known gestures may be referenced to determine a match between the known gestures and the gesture input. A degree of tolerance may be factored in to account for slight difference between the known gestures and the gesture input (e.g., writing style differences). In embodiments where the gesture is the set of coordinates, the gesture identification module 304 analyzes the set of coordinates to determine the action associated with the set of coordinates. For example, the gesture identification module 304 may determine that the set of coordinates represent a "B" which indicates the user's desire to buy an item represented on their client device upon which the "B" motion was written. While capital letters are used to describe example embodiments, it should be noted that the capital letters and lower case letters may be used interchangeable in example embodiments. Thus for example, while "B" is used to describe a buy commerce-related action, "b" can equally be used. In addition, symbols may be used to represent the commerce-related action. For example, "S" may be used to represent a pay request action.

In embodiments where in the gesture input is a motion of a device (or accessory coupled to a device, such as a cursor or UI controller), the gesture identification module 304 identifies the motion and converts the motion to an action. In some cases, the motion may be a shake of the client device which may indicate a refresh request. In other cases, the motion may be a side-way motion or a forward-backward motion which represents other actions (e.g., update request, last page, next page).

In some embodiments, the gesture identification module 304 may not recognize the gesture input. In these embodiments, the notification module 306 generates a notice to the user that the gesture input is not recognized. The notice may request that the user re-enter the gesture or use a different manner of providing a gesture input or provide a general input (e.g., use a cursor or keyboard). The notification module 306 then transmits the notice or provides the notice to the messaging engine 222 for transmission.

The gesture training module 308 learns new gestures or slight modifications to existing gestures. For example, a user of the client device may swipe a letter "B" in a script motion resulting in a "B" that appears like "a." The gesture training module 308 learns style differences presented by the user. As a result, the gesture engine 224 is more likely to recognize the style differences in the future.

The gesture application module 310 provides an application to the client device that allows the client device to provide gesture functions. The gesture application provides instructions to the client device in order for the client device to capture gesture inputs.

In alternative embodiments, the instructions provided by the gesture application module 310 also instruct the client device to convert a gesture input into a set of coordinates that represent the gesture input. In these cases, the client device may comprise a gesture database which is used to identify the commerce-related action based on the gesture input. The commerce-related action is then transmitted (as a gesture input) to the execution engine 226. Thus, the gesture input may be converted at the client device instead of at the publication system 120. Therefore, some of the modules of the gesture engine 224 may, in alternative embodiments, be located at the client device.

Figure 4:
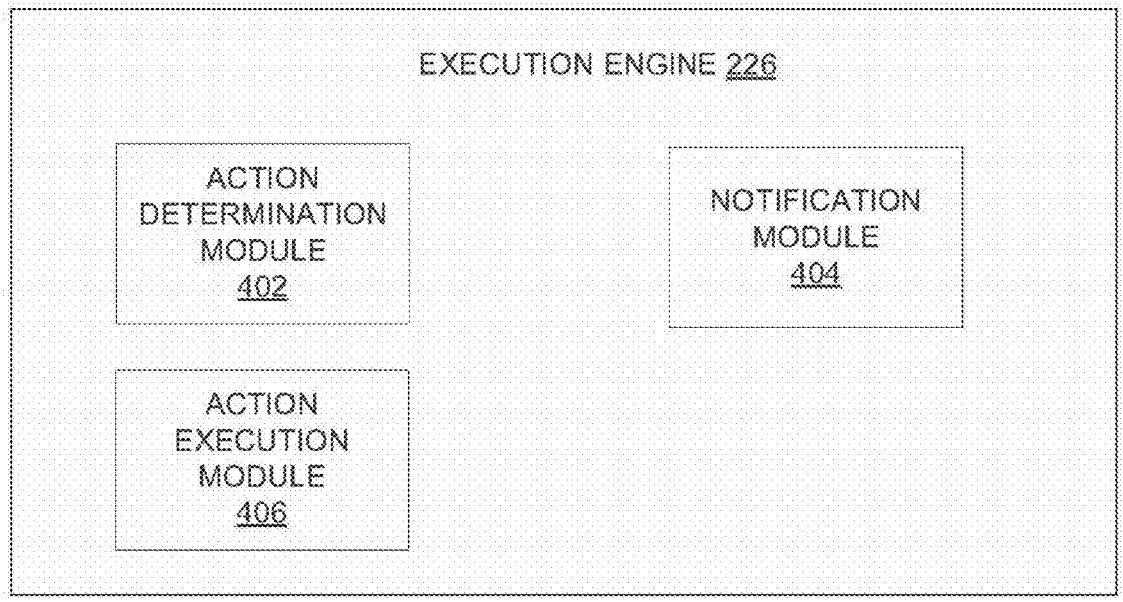
FIG. 4 is a block diagram illustrating an example embodiment of an execution engine.

Referring now to FIG. 4, an example diagram of the execution engine 226 is shown. The execution engine 226 manages the execution of actions that are represented by the gesture inputs. In example embodiments, once the gesture input is identified by the gesture identification module 304 and the corresponding action request is determined, the action request is sent to the execution engine 226 for processing. The execution engine 226 comprises an action determination module 402, a notification module 404, and an action execution module 406. Alternative embodiments may provide functionally equivalent components in more or less modules. Furthermore, some of the components of the execution engine 226 may be located elsewhere (e.g., in the gesture engine 224) or combined into a single module.

The action determination module 402 determines whether the action request received from the gesture identification module 304 is executable. In one embodiment, this determination is based on whether the commerce-related action is compatible with a status of the item of interest. For example, if the gesture input indicated a request to buy an item represented by the listing that the buy gesture input was indicated upon but the item has already been sold, then the action determination module 402 concludes that the action cannot be performed. Other statuses may include, for example, watching, no longer for sale, receiving bids, auction expired, and Buy-It-Now item.

The notification module 404 of the execution engine 226 manages notices to a user based on actions or non-actions of the execution engine 226. Thus, if the action determination module 402 determines that an action request cannot be performed, then the notification module 404 generates a notice to the user reporting the same. In embodiments where the action can be performed, the notification module 404 may generate a notice to the user upon execution of the action request. It should be noted that the notification module 306 of the gesture engine 224 and the notification module 404 of the execution engine 226 may be combined into a single notification module. Furthermore, the notification module 306 may transmit the notice or provides the notice to the messaging engine 222 for transmission.

The action execution module 406 performs the commerce-related action. In embodiments where the commerce-related action is to buy an item, the action execution module 406 initiates a purchase transaction. Conversely, if the commerce-related action is to sell an item, then the action execution module 406 initiates a sales transaction. The sales transaction may include generating and posting a listing for the item on the network-based marketplace. Alternatively, the sales transaction may be in response to an offer to buy in which case, the sales transaction completes the sale (e.g., accept the offer, close the listing for the item, and send a payment request to buyer). If the commerce-related action is to watch an item, then the action execution module 406 places the item into a watch list associated with the user. A commerce-related action to pay triggers a payment transaction. In one embodiment, the payment transaction may be an automatic transfer of funds to the seller. In an alternative embodiment, the payment transaction may trigger a payment interface whereby the user may enter payment information or verify pre-populated payment information.

While the gesture engine 224 and the execution engine 226 are shown as being a part of the publication system 120, it should be noted that one or more of the modules of the gesture engine 224 and the execution engine 226 may be located at the client device. That is, some of the functionality may be provided, in part, by the client device.

Figure 5:
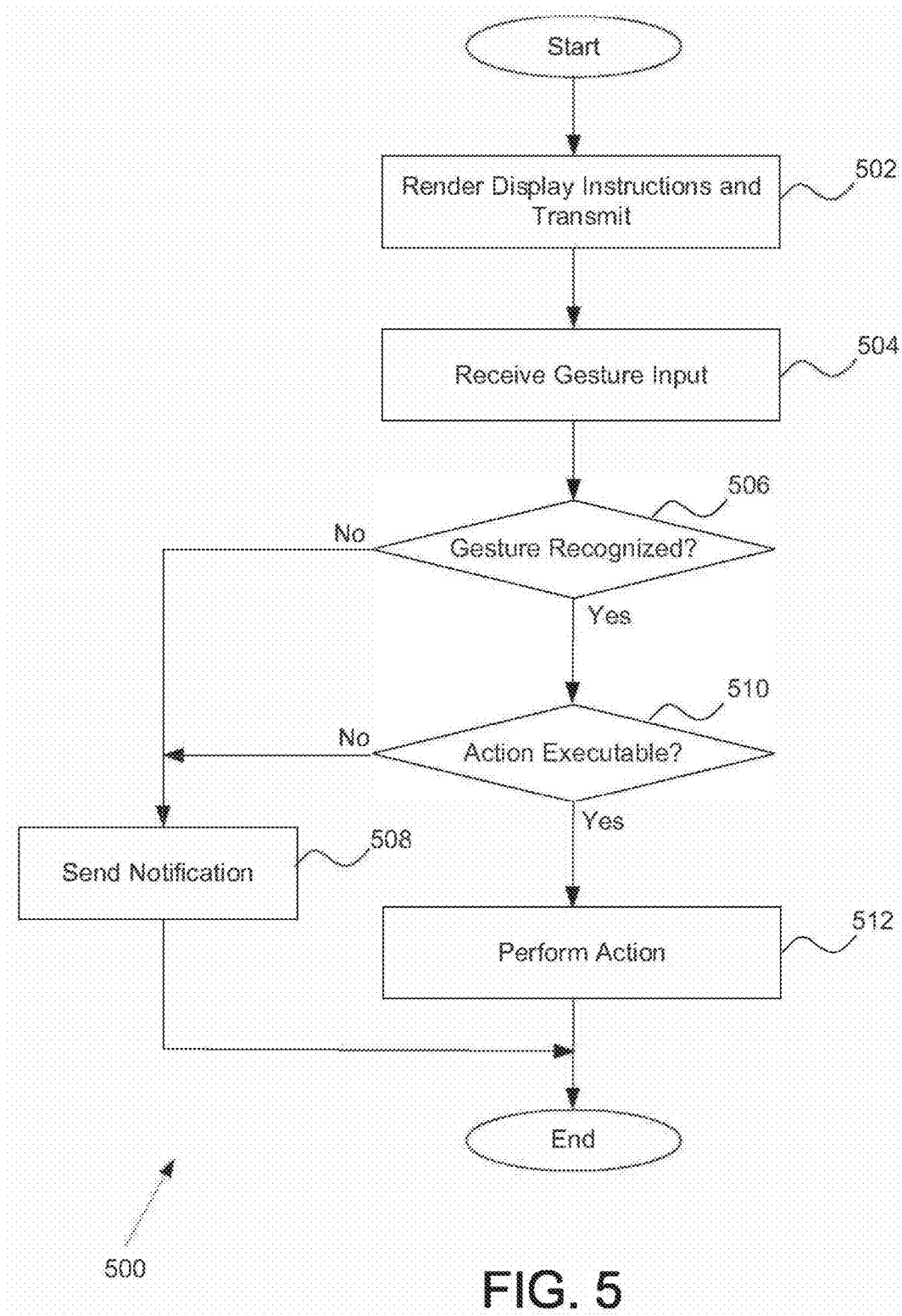
FIG. 5 is a flowchart illustrating a method to provide gesture functions at a device.

FIG. 5 is a flowchart illustrating a method 500 to provide gesture functions at a client device. At operation 502, display instructions for providing an interface on the client device is rendered and transmitted. In some embodiments, the imaging engine 214 in connection with the auction engines 204 provides information regarding items available via the network-based marketplace. In one example, the information may comprise one or more item listings whereby each item listing represents an item available for purchase or auction. The information may be determined in response to a search or browsing for items of interest performed by the user at the client device. The display instructions are received by the client device and displayed to the user.

In response, the user may decide to perform an action with respect to information (e.g., a publication or listing) provided by the display instructions. In various embodiments, the user may, for example, sell, buy, watch, or pay for an item represented by the information. In other embodiments, the user may request an update to the information. For example, the user may monitor an auction for an item, and request an update in order to check if new bid offers have been submitted since the last update or receipt of information.

The user provides a gesture input on their client device which reflects the action they desire to perform. Thus, the user may draw a letter (e.g., S, B, W, P) or symbol (e.g., $, +) on a touch-sensitive display of the client device. Alternatively, the user may shake the client device or move the client device in a particular motion. The gesture input is received at operation 504. In example embodiments, the gesture input module 302 receives the gesture input.

At operation 506, a determination is made as to whether the gesture input is recognized as representing an action request. In example embodiments, the gesture identification module 304 performs the determination. In one embodiment, the gesture identification module 304 may access a database of known gesture inputs and compares the received gesture input to the known gesture inputs.

If a no match is found, then a notification is sent at operation 508. The notification informs the user that the gesture input is unrecognizable and may request the user to re-enter the gesture input. Alternatively, the user may be requested to provide the action request using a different gesture input method or general input method (e.g., use a cursor or keyboard).

If at operation 506, the gesture input is recognized, then at operation 510, a further determination is made as to whether the commerce-related action is executable (e.g., compatible with a status of the item of interest). If the commerce-related action is not executable, a notification to that effect is sent at operation 508. However, if the action is executable, then the action is performed at operation 512.

Figure 6A:
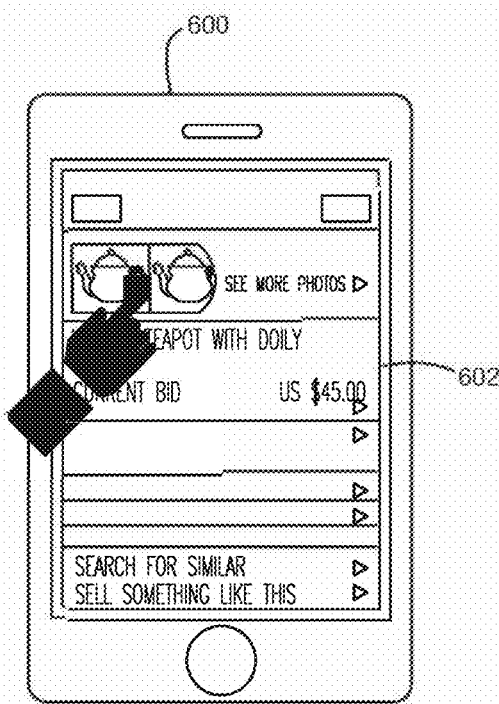
FIG. 6a and FIG. 6b illustrate an example of a gesture input at a client device.

FIG. 6a illustrates an example of a gesture input at a client device 600. The client device 600 comprises a display area 602 wherein information from the network-based marketplace may be displayed. The information may be arrived at via a search on the network-based marketplace or via browsing the network-based marketplace. In the present example, a user of the client device 600 is interested in buying an item illustrated in the display area. As such, the user may indicate on a touch-sensitive display of the client device 600 their desire to buy the item.

Figure 6B:
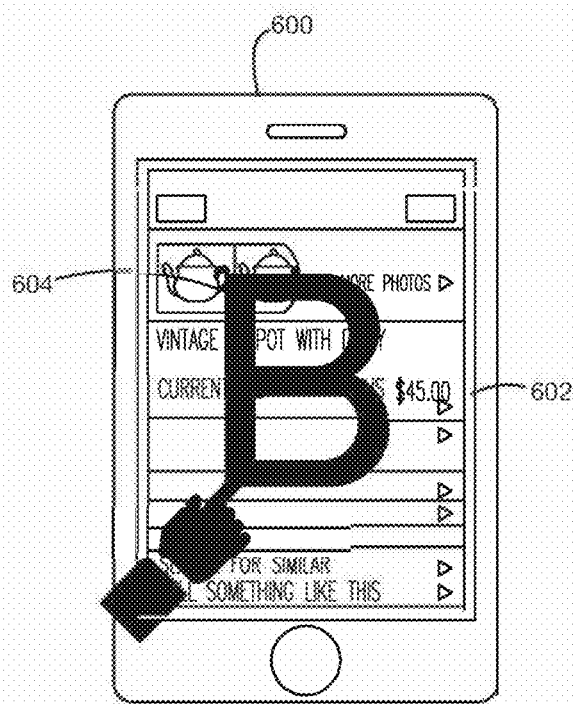

Moving from FIG. 6a to FIG. 6b, the user has drawn a letter "B" on the touch-sensitive display of the client device 600. The "B" indicates a desire to buy the item (e.g., "Buy it Now" item) or "B" may indicate a desire to place a bid on the item if the item is up for auction.

Figure 7B:
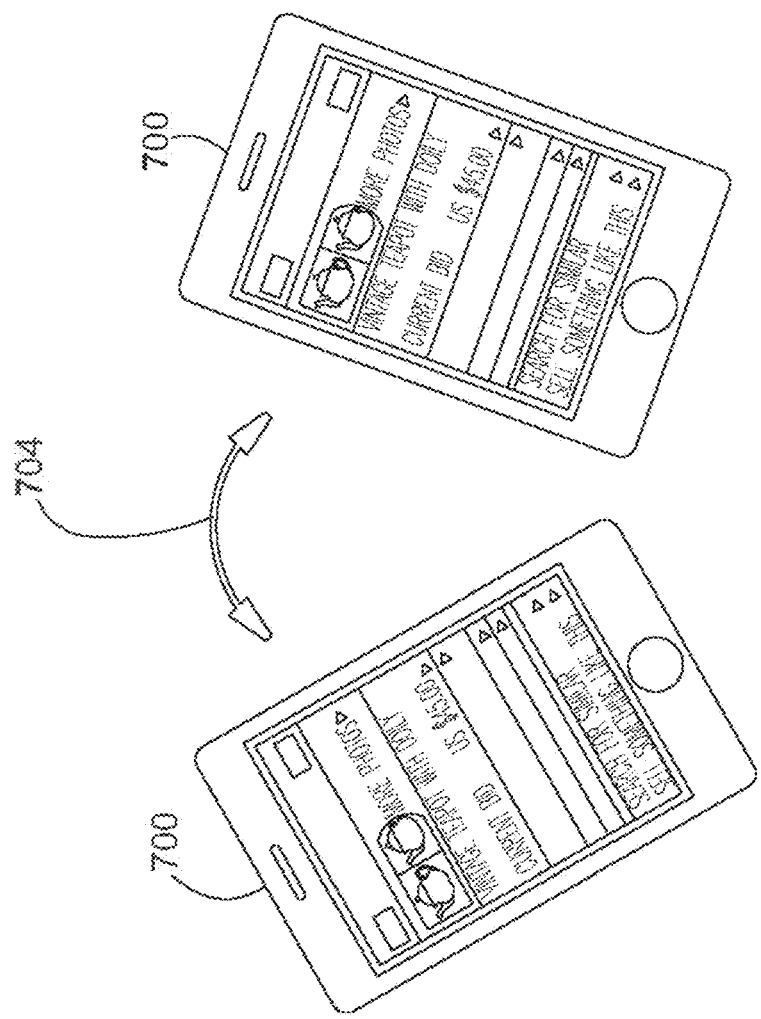
FIG. 7a and FIG. 7b illustrate other examples of gesture inputs at the client device.
Figure 7A:
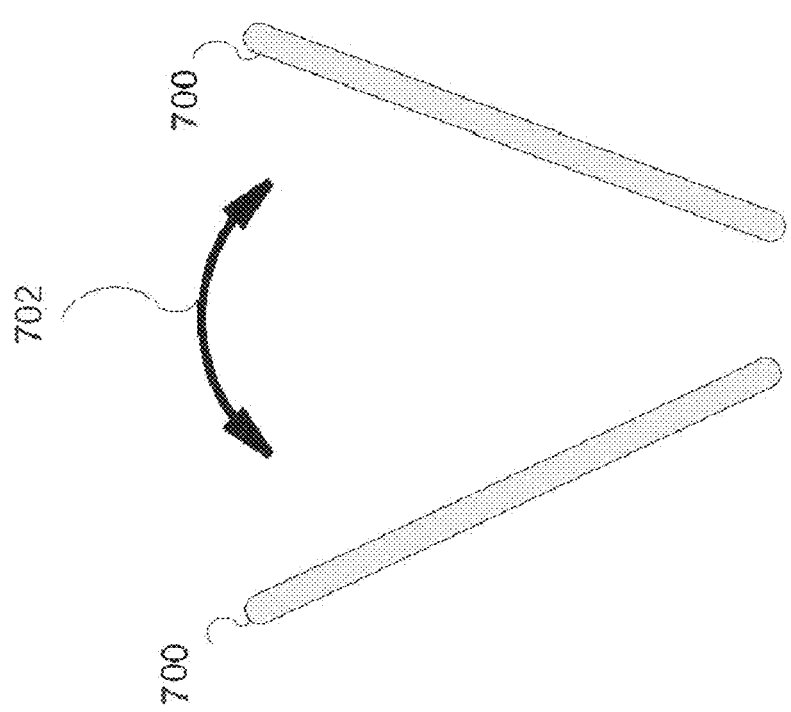

FIG. 7a and FIG. 7b illustrate more examples of gesture inputs at a client device 700. These examples show a motion performed with the client device 700 which may trigger an action with respect to information being displayed on the client device 700. As shown in FIG. 7a, the client device 700 is moved in a forward-backward motion 702. Alternatively, FIG. 7b shows the client device 700 moved in a sideway motion 704. Other motions may be used. For example, the client device 700 may be shaken.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 8:
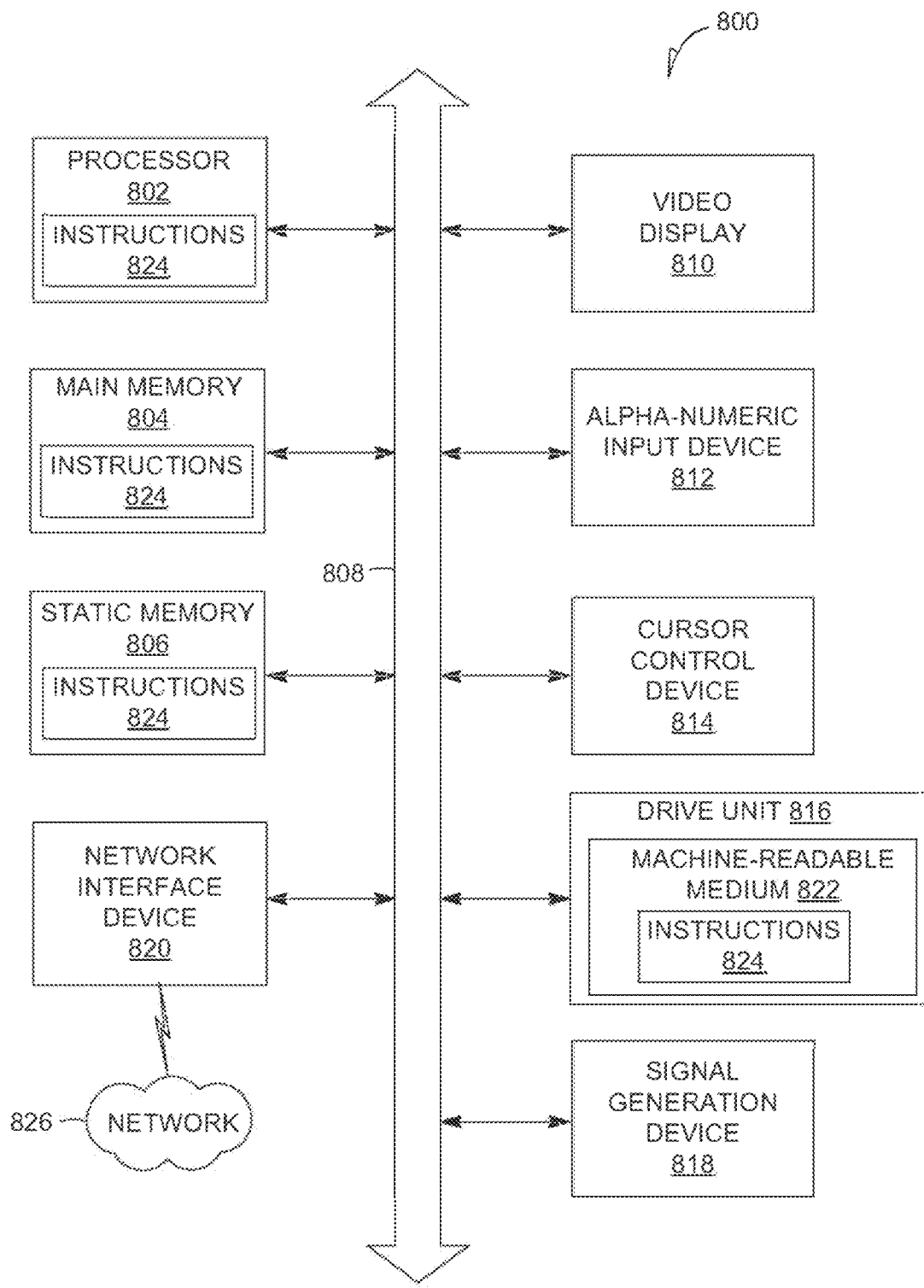
FIG. 8 is a simplified block diagram of a machine in an example form of a computing system within which a set of instructions for causing the machine to perform any one or more of the methodologies discussed herein may be executed.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method to provide gesture functionality, the method comprising:
   receiving, by a computing device, a gesture input in relation to an action by a networked environment;
   identifying, by the computing device, a style difference between a known gesture input of a set of known gesture inputs and the received gesture input;
   learning, by the computing device, to recognize the received gesture input as the known gesture input based on identifying the style difference; and
   causing, by the computing device, an action request that corresponds to the known gesture input to be performed within the networked environment based on a compatibility between the action request and a status associated with the networked environment.

2. The method of claim 1, further comprising generating a notice that the action request is performed.

3. The method of claim 1, further comprising:
receiving a different gesture input in relation to the action by the networked environment;
determining that the different gesture input is not recognized; and
generating a notice that the different gesture input is not recognized.

4. The method of claim 3, further comprising requesting that the different gesture input be re-entered.

5. The method of claim 1, further comprising training a module to learn to recognize the received gesture input as the known gesture input.

6. The method of claim 1, further comprising causing modification of the set of known gesture inputs to include the style difference by updating a database that stores the set of known gesture inputs.

7. The method of claim 1, wherein the action is associated with an image posted on the networked environment.

8. The method of claim 1, wherein the status is associated with an image posted on the networked environment.

9. A computing device comprising:
at least one user interface to receive a gesture input in relation to an action by a networked environment; and
a gesture engine implemented at the computing device to:
identify a style difference between a known gesture input of a set of known gesture inputs and the received gesture input;
learn to recognize the received gesture input as the known gesture input based on identifying the style difference; and
cause an action request that corresponds to the known gesture input to be performed within the networked environment based on a compatibility between the action request and a status associated with the networked environment.

10. The computing device of claim 9, wherein the gesture engine is further configured to:
receive a different gesture input in relation to the action by the networked environment;
determine that the different gesture input is not recognized; and
generate a notice that the different gesture input is not recognized.

11. The computing device of claim 10, wherein the gesture engine is further configured to request that the different gesture input be re-entered.

12. The computing device of claim 9, further comprising a gesture database to store the set of known gesture inputs.

13. The computing device of claim 12, wherein the gesture engine is further configured to cause modification of the set of known gesture inputs to include the style difference by updating the gesture database.

14. The computing device of claim 9, wherein the action is associated with an image posted on the networked environment, and the status is associated with the posted image.

15. One or more non-transitory computer-readable storage media storing instructions that are executable by a computing device to perform operations including:
receiving a gesture input in relation to an action by a networked environment;
identifying a style difference between a known gesture input of a set of known gesture inputs and the received gesture input;
learning to recognize the received gesture input as the known gesture input based on identifying the style difference; and
causing an action request that corresponds to the known gesture input to be performed within the networked environment based on a compatibility between the action request and a status associated with the networked environment.

16. The one or more non-transitory computer-readable storage media of claim 15, wherein the operations further include:
receiving a different gesture input in relation to the action by the networked environment;
determining that the different gesture input is not recognized; and
generating a notice that the different gesture input is not recognized.

17. The one or more non-transitory computer-readable storage media of claim 16, wherein the operations further include requesting that the different gesture input be re-entered.

18. The one or more non-transitory computer-readable storage media of claim 15, wherein the operations further include training a module to learn to recognize the received gesture input as the known gesture input.

19. The one or more non-transitory computer-readable storage media of claim 15, wherein the operations further include causing modification of the set of known gesture inputs to include the style difference by updating a database that stores the set of known gesture inputs.

20. The one or more non-transitory computer-readable storage media of claim 15, wherein the action is associated with an image posted on the networked environment, and the status is associated with the posted image.

\* \* \* \* \*